United States Patent [19]

Moss et al.

[11] Patent Number: 4,653,562
[45] Date of Patent: Mar. 31, 1987

[54] AUTOMOTIVE WINDOW SAFETY GUARD

[76] Inventors: Elizabeth L. Moss, 404 E. Davis Blvd., Tampa, Fla. 33606; Jean-Marie Guillen, 2803 W. Sligh, #1115, Tampa, Fla. 33614

[21] Appl. No.: 885,394

[22] Filed: Jul. 18, 1986

Related U.S. Application Data

[63] Continuation of Ser. No. 763,913, Aug. 8, 1985, abandoned, which is a continuation of Ser. No. 513,335, Jul. 13, 1983, abandoned.

[51] Int. Cl.⁴ ................................................ E06B 3/32
[52] U.S. Cl. ................................ 160/105; 160/368 S; 160/DIG. 2; 296/146
[58] Field of Search ......... 160/105, 226, 227, DIG. 2, 160/222, 225, 215, 368 R, 368 S, DIG. 3, 47, 375; 49/55; 296/24 R, 146, 95 R

[56] References Cited

U.S. PATENT DOCUMENTS

| | | | |
|---|---|---|---|
| 1,608,785 | 11/1926 | Evans | 160/105 |
| 1,702,395 | 2/1929 | Anderson | 160/105 |
| 1,914,228 | 6/1933 | Woodruff | 160/227 |
| 2,704,121 | 3/1955 | Maidhof et al. | 160/227 X |
| 2,742,961 | 4/1956 | Van Camp et al. | 160/105 |
| 2,864,648 | 12/1958 | Bland | 49/57 X |
| 2,873,800 | 2/1959 | Kogan | 160/105 X |
| 2,892,495 | 6/1959 | Hadden | 160/DIG. 2 X |
| 2,915,119 | 12/1959 | Cox | 160/105 X |
| 3,032,351 | 5/1962 | Lewis | 49/57 X |
| 3,044,800 | 7/1962 | Wicker | 296/24 R X |
| 3,422,876 | 1/1969 | Fester | 160/105 |
| 4,285,383 | 8/1981 | Steenburgh | 160/374 |
| 4,398,586 | 8/1983 | Hall | 160/105 |

Primary Examiner—Ramon S. Britts
Assistant Examiner—David M. Purol
Attorney, Agent, or Firm—Frijouf, Rust & Pyle

[57] ABSTRACT

A rigid, open air wire screen structure with attachment rails designed for temporary and reusable placement in the window channels of motor vehicles. The screen structure, similar to that of a wire grocery shopping cart is constructed of two screen parts, each shaped to complement the other in one of several positional relationships, whereby all of the five basic automobile windows may be accommodated. Its purpose is to prevent the suffocation of pet animals or small children and to prevent injury or death resulting from pet animals or children jumping or climbing out of a moving or stationary vehicle. The two parts are assembled by frictional engagement with a top and bottom rail. The top rail has a rib to interfit with the top window glass guide, and the bottom rail has a groove to accept the window pane. The assembly is then anchored by forcing the window glass upwardly into the bottom rail.

2 Claims, 10 Drawing Figures

U.S. Patent    Mar. 31, 1987    Sheet 1 of 2    4,653,562
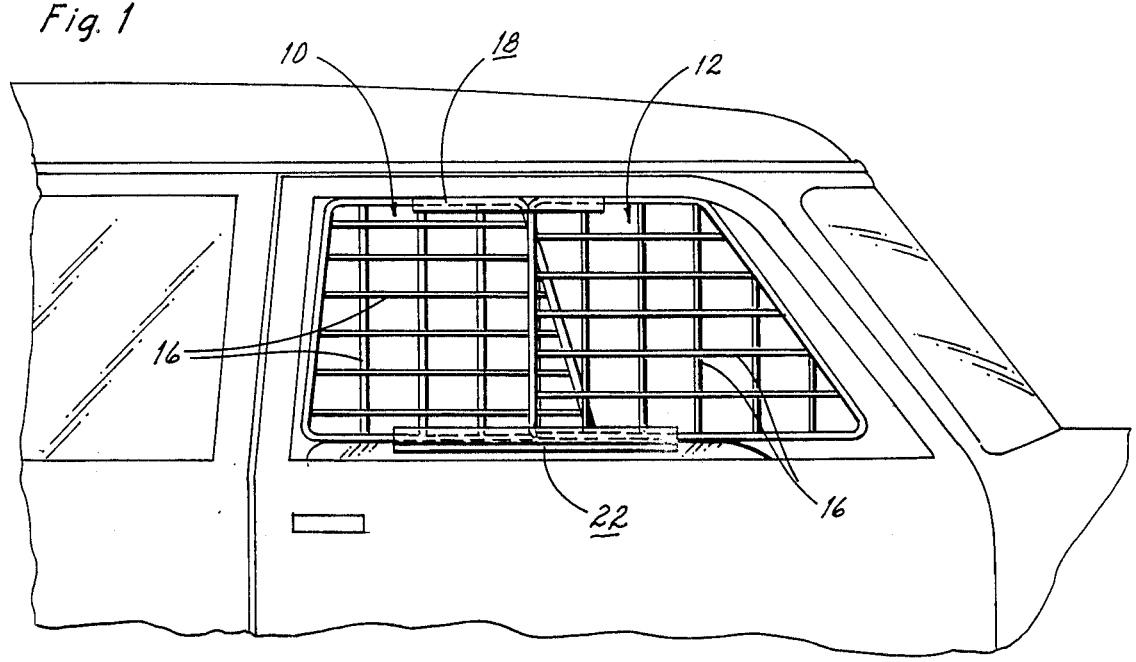
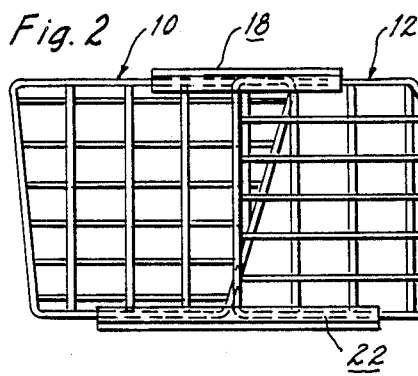
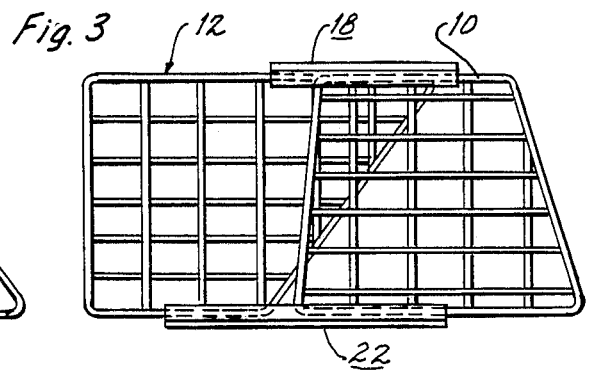
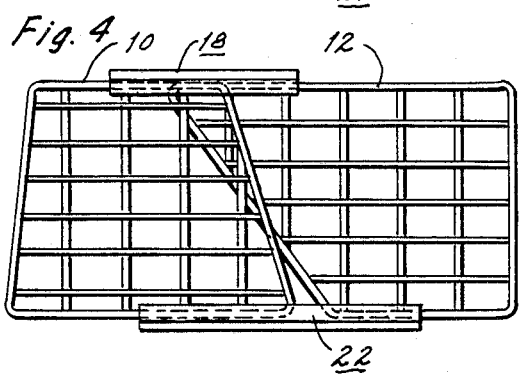
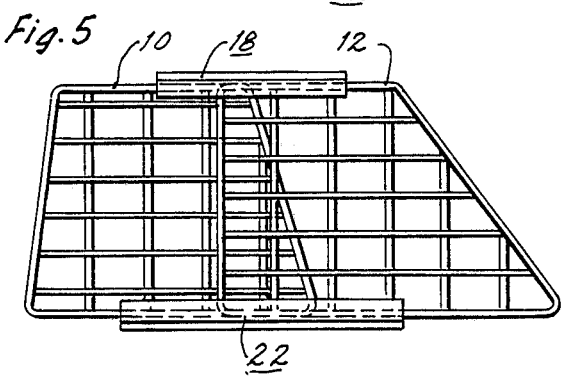
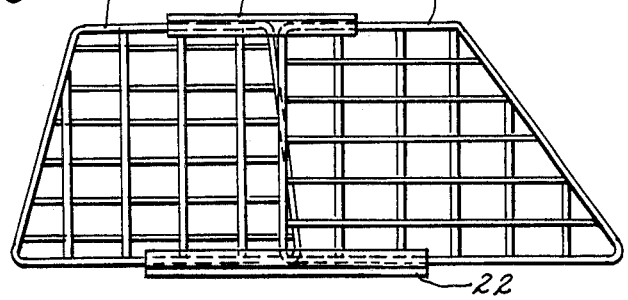

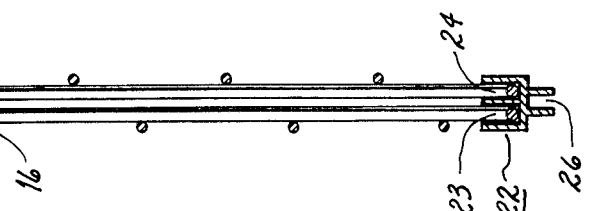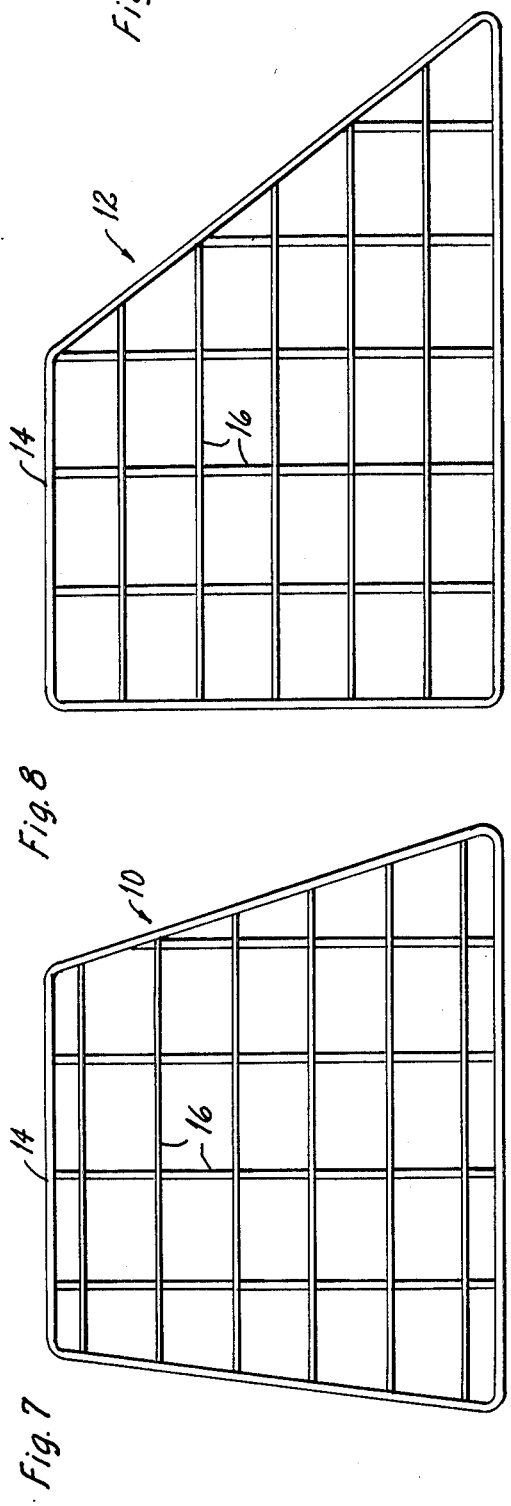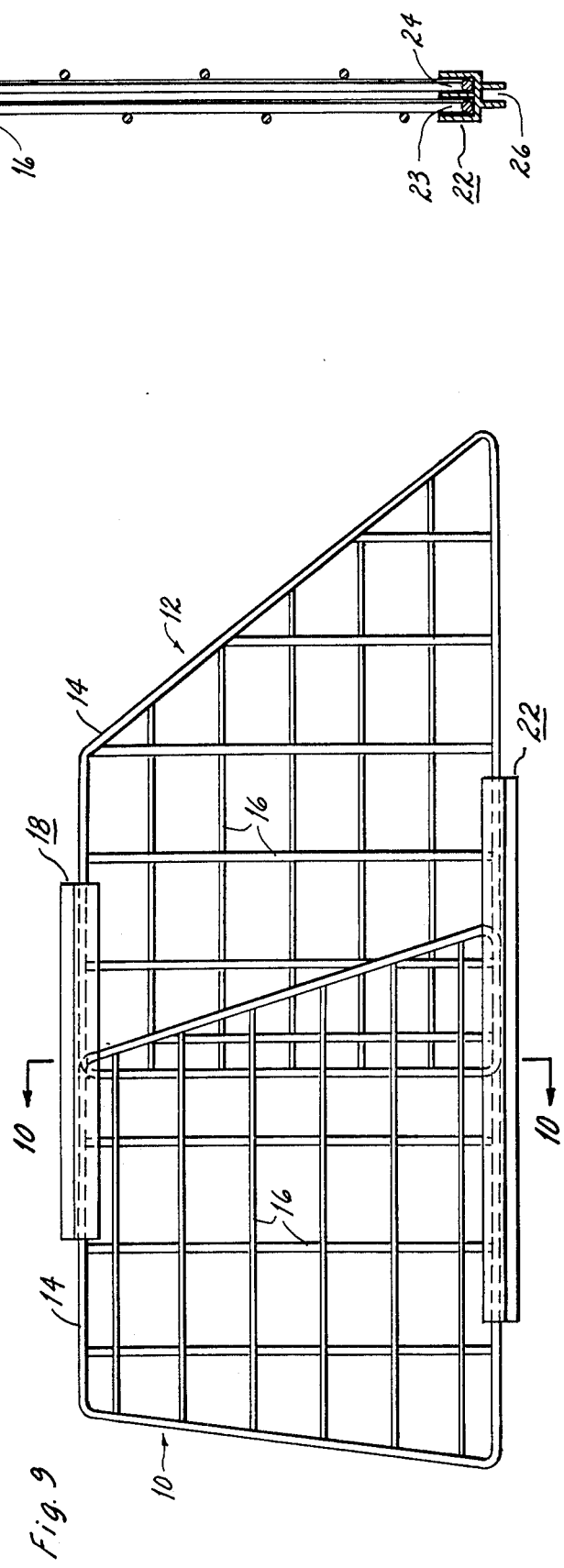

AUTOMOTIVE WINDOW SAFETY GUARD

This is a continuation of application Ser. No. 763,913, filed Aug. 8, 1985, now abandoned, which is a continuation of Ser. No. 513,335, filed July 13, 1983, now abandoned.

BACKGROUND OF THE INVENTION

1. Field of the Invention

This invention relates to an automotive window guard which provides ventilation but prevents projection of animal or human extremities outside the vehicle's parameter.

2. Information Disclosure Statement

The problems defined are the fatal suffocation of pet animals and/or small children left unattended in motor vehicles with the windows up or even slightly open and the related injuries or death as a result of pet animals or children exiting through the open window of a moving or stationary vehicle.

Public Service advertisers have spent millions of dollars to prevent this deadly situation from happening. Their report states that even during winter, and especially during summer, extremely high temperatures build up within a closed vehicle resulting in a lack of oxygen and ultimately suffocation of the occupants. The dilemma is how to leave the vehicle momentarily unattended with pet or child inside with the windows down without the fear of losing or injuring pet or child as a result of their being able to jump or climb out of the open window of the vehicle. Rolling up the windows is the fatal mistake.

The next related problems exists when pet animals or small children are inside a moving vehicle with the windows open. There is no longer the danger of suffocation, however there exists the possibility of pet or child jumping or climbing out of the vehicle while in motion causing serious injury or death.

Another problem which has always existed is the danger of losing human or animal extremities projected outside the window of a motor vehicle.

There is also a specific problem which occurs more frequently to pet animals. An animal placing its head outside the window of a moving vehicle is subjecting the conjunctiva, cornea and anterior chamber of the eye to permanent scar damage caused by impacting wind containing minute pollutant particles.

An extended search of issued patents, literature, and products available on the market has yielded two patents, Bland, U.S. Pat. No. 2,864,648 and Biggers, U.S. Pat. No. 3,049,373 which are of rigid nature for transfer station wagon use to separate pet animals from human occupants of a station wagon automobile.

A known available structure is marketed under the trademark "WAGON BARRIER", manufactured by Mid-West Metal Products, Inc., Muncie, Ind. There are several patented window screen devices for automobiles. Note Lewis, U.S. Pat. No. 3,032,351 whose rigid metallic grill includes an upstanding flange 11 and a lower channel 13 for reception in a vehicle window for protective ventilation purposes.

Galla, U.S. Pat. No. 2,568,800 has a fixed frame including a lower channel and an upper flange for reception in a vehicle window.

The screen of Gill, U.S. Pat. No. 2,139,156 is in two pieces to facilitate hand signalling.

The screen of Morrow, U.S. Pat. No. 2,702,596, permits some adjustability as seen in FIG. 2, but is otherwise not suggestive of the present invention.

The purpose of the above-noted Wagon Barrier" is to separate pet animals from human occupants of a station wagon automobile. The unit functions to maintain pet animals in the rear portion of the station wagon vehicle.

For reference purposes, the present invention is known as the "Safety Guard". The Safety Guard differs from the Wagon Barrier in that it does not separate occupants within the vehicle, but rather prevents occupants and pet animals from projection outside the window areas of a vehicle. At the same time, the Safety Guard allows full air passage while the above-referenced Wagon Barrier does not provide ventilation from outside the vehicle.

It is an object of this invention to form a safety guard of specific shape to approximate vehicle window channel areas.

It is a further object of this invention to provide a safety guard which attaches into the window channel and onto the window glass, the window glass being in a fully opened position.

A further object of this invention is that the safety guard adjusts by two distinct methods, the first being that the wire screens can be placed in a plurality of related positions to form a plurality of overall different shapes, and the second is that all shapes can be increased or decreased horizontally within the upper and lower double channel attachment rails.

SUMMARY OF THE INVENTION

Two complimentary screen members fitted together for association in a plurality of relative positions within the window opening of a motor vehicle. There is a first trapezoidal screen having a frame. The frame having a first and a second parallel run with the said first run being longer than the second run.

The frame also having a first and second nonparallel bridging runs, said bridging runs connected to the longer parallel run each at an acute angle and to the shorter parallel run each at an obtuse angle. The first screen member is illustrated at FIG. 7.

A second trapezoidal screen member also having a frame. The frame of the second screen member having a first and a second parallel run with the first run being longer than the second run. The frame of the second screen having first and second nonparallel bridging runs. The first bridging run is connected to the first and second parallel runs each at a right angle. See FIG. 8. The second bridging run connected to the longer parallel run at an acute angle and to the shorter parallel run at an obtuse angle.

Thus, two automotive window safety guard and ventilator screen elements are provided with first and second rail clamps for securing the two screens into a combination of trapezoidal units larger than either said elements, to thereby approximate an automotive window opening.

The ability to selected relative positions for the two screen members, to then bind them by two rail members, and to extend or retract the two members relative to one another, in order to approximate the outline of one of several automotive window openings, is a novel approach for enabling the cost effective supply for window guards in automotive field of a great variety of window openings.

BRIEF DESCRIPTION OF THE DRAWINGS

For a fuller understanding of the nature and objects of the invention, reference should be had to the following detailed description taken in connection with the accompanying drawings in which:

FIG. 1 illustrates one relative positional relationship of two trapezoidal screens in the window opening of a motor vehicle;

FIGS. 2-6 illustrate five possible screen relationships;

FIG. 7 is one trapezoidal screen of the combination;

FIG. 8 is another trapezoidal screen of the combination;

FIG. 9 illustrates the two screens in the relative relationship of FIG. 8 functionally joined and ready for installation into a vehicle window opening; and FIG. 10 is a section taken along line 10—10 of FIG. 9.

Similar reference characters refer to similar parts throughout the several views of the drawings.

DETAILED DESCRIPTION

The preferred embodiment of the invention described consists of four pieces, two similar screens 10 and 12 and two similar rails 18 and 22. Referring to FIGS. 7 and 8, there are illustrated two flat trapezoidal-shaped screens 10 and 12 which are constructed of steel perimeter wires 14 with center wires 16 welded together. The center wires 16 are crosscross and perpendicular and placed at two inch square intervals to one another within the perimeter wires. The perimeter wires 14 and vertical wires of the center 16 are three sixteenths of an inch thick and the horizontal wires of the center 16 are one-eighth of an inch thick.

Referring to FIGS. 9 and 10, there are illustrated two rigid aluminum rails 18 and 22 individually constructed as one-piece extrusions. Referring to FIG. 9, the top rail 18 has a one-half inch deep double channel 19-20 and above the double channel is a one-half inch upright fin 21. The bottom rail 22 has a one-half inch deep double channel 23-24 and below double channel 23-24 is a three-eighth inch deep single channel 26.

Referring to FIG. 9, screens 10 and 12 are arranged parallel to one another with their respective parallel sides attaching into the double channels 19-20 and 23-24 of the rails 18 and 22.

Referring to FIGS. 2-4, there is illustrated the assembly of screens 10 and 12 attached to rails 18 and 22 and arranged in five of several possible configurations.

The assembled unit is attached to an existing vehicle window channel in such a manner that the single channel 26 of the bottom rail 22 is placed onto the upper edge of the open window glass and the upright fin 21 of the top rail 18 is positioned to insert into the upper window channel. Moving the window glass slightly upward secures the upright fin 21 into the upper window channel.

By moving screens 10 and 12 horizontally within the double channels 18 and 22, the non-parallel sides of screens 10 and 12 can be inserted at least partially into the left and right sides of the window channel whereby the assembly is firmly secured. When installed, the assembly performs to permit full air flow within the vehicle and suitably retains occupants thereby preventing suffocation or serious injury.

Note that there is no attempt to fit the combination to the full parameter of the vehicle window as would be required to insect screening. The object of this invention is to physically restrain animal movement and substantial fit of the opening will accomplish that result. the illustration of FIG. 1 is purposely illustrated as an exaggerated condition to emphasize that fact.

What is claimed is:

1. An automotive window safety guard and ventilator screen capable of being configured into a plurality of composite configurations corresponding to a plurality of an open automotive window frames where the window frame configuration has a top, bottom, and two side runs, and mounts a vertically slidable window pane and includes a channel at the top thereof for receiving a marginal portion of the window pane, comprising:

a first trapezoidal screen defined by two parallel runs and by two non parallel runs with a cross grid within the area defined by said runs;

said first trapezoidal screen having one of its non-parallel bridging runs connected at a right angle to each said parallel runs;

a second trapezoidal screen defined by two parallel runs and by a first and second non parallel bridging gun, with a cross grid within the area defined by said runs;

said second trapezoidal screen having said first non parallel bridging run connected to each said parallel runs in an acute angular relationship, and said second non parallel bridging run connected to said parallel runs in an obtuse angular relationship;

a means for removably securing said first and second trapezoidal screens to the open automotive window frame thereby forming a combination of trapezoidal units larger than either said screen, to approximate a first, second, third, fourth and fifth automotive window opening;

said means for removably securing said first and second trapezoidal screens comprising first and second rail clamps;

said first rail clamp comprising;

a planar base of an elongated rectangular configuration defining an elongated direction thereof, and including a top surface, a bottom surface, first and second side edges orientated along the direction of elongtion, first, second, and third parallel planar flanges depending from the bottom surface of said planar base and extending at right angles thereto, said first planar flange arranged at the first side edge of said planar base, said third planar flange arranged at the second side edge of said planar base, said second planar flange arranged intermediate said first and third planar flanges, said planar base further comprising a fourth planar flange depending from the top surface of said planar base and extending at right angles thereto, said fourth planar flange defining a plane thereof coinciding with said second planar flange, said first and second planar flanges clampingly receives one of said first and second trapezoidal screens, said second and third planar flanges clampingly receives the other of said first and second trapezoidal screens, said fourth planar flange being dimensioned to insert into the channel at the top of said window frame;

said second rail clamp comprising;

a planar base of an elongated rectangular configuration defining an elongated direction thereof, and including a top surface, a bottom surface, first and second side edges orientated along the direction of elongation, first, second and third parallel planar flanges depending from the top surface of said planar base and extending at right angles thereto;

said first planar flange arranged at the first side edge of said planar base, said third planar flange arranged at the second side edge of said planar base, said second planar flange arranged intermediate said first and third planar flanges;

said planar base further comprising fourth and fifth parallel planar flanges depending from the bottom surface of said planar base and extending at right angles thereto, said fourth planar flange defining a plane thereof coinciding between said first and second planar flanges, said fifth planar flange defining a plane thereof coinciding between said second and third planar flanges, said first and second planar flanges clampingly receives one of said first and second trapezoidal screens, said second and third planar flanges clampingly receives the other of said first and second trapezoidal screens, said fourth and fifth planar flanges being dimensioned to receive said window pane for locking said first and second trapezoidal screens within said window frame, wherein said first and second screens are selectively and cooperatively adapted to be arranged into a first automotive window opening configuration with said parallel runs of said first and second screens parallel to one another and planar, having a composite trapezoidal form with an obtuse angle defining a closure for the lower rear corner of a window opening, and an acute angle defining a closure for the lower forward corner of the window opening;

wherein said first and second screens are selectively and cooperatively adapted to be arranged into a second automotive window opening configuration with said parallel runs of said first and second screens parallel to one another and planar, having a composite trapezoidal form with a right angle defining a closure for the lower rear corner of a window opening and an acute angle defining a closure for the lower forward corner of the window opening;

wherein said first and second screens are selectively and cooperatively adapted to be arranged into a third automotive window opening configuration with said parallel runs of said first and second screens parallel to one another and planar, having a composite trapezoidal form with an acute angle defining a closure for the lower rear corner of a window opening and a right angle defining a closure for the lower forward corner of the window opening;

wherein said first and second screens are selectively and cooperatively adapted to be arranged into a fourth automotive window opening configuration with said parallel runs of said first and second screens parallel to one another and planar, having a composite trapezoidal form with an acute angle defining a closure for the lower rear corner of a window opening and an acute angle defining a closure for the lower forward corner of the window opening;

wherein said first and second screens are selectively and cooperatively adapted to be arranged into a fifth automotive window opening configuration with said parallel runs of said first and second two screens being parallel to one another and planar, having a composite trapezoidal form with an acute angle defining a closure for the lower rear corner of a window opening and an acute angle defining a closure for the lower forward corner of the window opening, said second screen acute angle presenting the larger angle thereof as the closure for the lower rear corner and a small acute angle overlapping the second screen; and wherein one of said first, second, third, fourth and fifth configurations is utilized to configure the automotive window opening.

2. The window safety guard defined in claim 1, wherein said parallel and non parallel runs are steel.

* * * * *

UNITED STATES PATENT AND TRADEMARK OFFICE
CERTIFICATE OF CORRECTION

PATENT NO. : 4,653,562
DATED : March 31, 1987
INVENTOR(S) : Elizabeth L. Moss

It is certified that error appears in the above-identified patent and that said Letters Patent are hereby corrected as shown below:

In the Specification

Column 3, line 2 from the bottom of the column, delete "parameter" and insert therefor --perimeter--.

In the Claims

Column 4, line 9, delete "an".
Column 4, line 22, "gun" should be --run--.
Column 4, line 24, delete "non".
Column 4, line 25, insert --non-- after "said".
Column 4, line 27, delete "non" after "second" and insert --non-- after "said".
Column 4, line 43, delete "elongtion" and insert --elongation--.
Column 6, line 40, delete "configure" and insert therefor --approximate--.

Signed and Sealed this

Twenty-fifth Day of August, 1987

Attest:

DONALD J. QUIGG

Attesting Officer

Commissioner of Patents and Trademarks